United States Patent
Kolesnikov et al.

(10) Patent No.: US 9,401,804 B2
(45) Date of Patent: *Jul. 26, 2016

(54) LEAKAGE RESILIENT GARBLED CIRCUIT GENERATION USING REDUCED MEMORY HARDWARE TOKEN

(75) Inventors: Vladimir Kolesnikov, Jersey City, NJ (US); Virendra Kumar, Decatur, GA (US)

(73) Assignee: Alcatel Lucent, Boulogne-Billancourt (FR)

(*) Notice: Subject to any disclaimer, the term of this patent is extended or adjusted under 35 U.S.C. 154(b) by 620 days.

This patent is subject to a terminal disclaimer.

(21) Appl. No.: 13/242,743

(22) Filed: Sep. 23, 2011

(65) Prior Publication Data

US 2012/0076302 A1    Mar. 29, 2012

Related U.S. Application Data

(60) Provisional application No. 61/387,102, filed on Sep. 28, 2010.

(51) Int. Cl.
*H04L 9/06* (2006.01)
*H04L 9/32* (2006.01)
(Continued)

(52) U.S. Cl.
CPC ............. *H04L 9/0662* (2013.01); *H04L 9/14* (2013.01); *H04L 9/28* (2013.01); *H04L 9/3249* (2013.01); *H04L 2209/12* (2013.01); *H04L 2209/46* (2013.01)

(58) Field of Classification Search
CPC ........... H04L 9/0662; H04L 9/14; H04L 9/28; H04L 2209/12; H04L 9/3249
USPC ............ 380/44, 255, 259, 277, 285; 713/168, 713/189, 171, 193; 726/1, 24–26
See application file for complete search history.

(56) References Cited

U.S. PATENT DOCUMENTS 7,143,066 B2 * 11/2006 Shear ................. G06Q 20/3674
705/54
7,240,198 B1 * 7/2007 Pinkas .................... H04L 9/321
713/168

(Continued)

OTHER PUBLICATIONS

Kolesnikov, Vladimir, and Thomas Schneider. "Improved garbled circuit: Free Xor gates and applications." Automata, Languages and Programming. Springer Berlin Heidelberg, 2008. 486-498.*

(Continued)

*Primary Examiner* — Kari Schmidt
(74) *Attorney, Agent, or Firm* — Ryan, Mason & Lewis, LLP (57) ABSTRACT

A garbled circuit is generated for a client in a leakage-resilient manner with a reduced memory requirement. The garbled circuit is used for secure function evaluation between the client and a server. The garbled circuit is generated with a reduced storage requirement by obtaining a token from the server; querying the token gate-by-gate, wherein for each gate of the garbled circuit, the token generates new wire garblings and stores them with the client using a Stream Cipher and interacts with the leakage-protected area to generate a garbled table for the gate; and receiving the garbled circuit from the token. The token comprises a leakage-protected area. The Stream Cipher is leakage-resilient and can be a symmetric-key cryptographic primitive that has a secret key as an input and generates an unbounded stream of pseudorandom bits as an output. The number of evaluations of the Stream Cipher is kept to a substantial minimum. For example, the Stream Cipher can execute with a same key only twice, such as only once for an encryption and only once for a decryption.

21 Claims, 3 Drawing Sheets

(51) Int. Cl.
*H04L 9/14* (2006.01)
*H04L 9/28* (2006.01)

(56) References Cited

U.S. PATENT DOCUMENTS

| | | | | |
|---|---|---|---|---|
| 7,549,068 | B2* | 6/2009 | Kunemund | 713/320 |
| 8,332,653 | B2* | 12/2012 | Buer | G06F 21/53 380/277 |
| 8,630,620 | B2* | 1/2014 | Cha | H04L 63/04 380/247 |
| 8,689,010 | B2* | 4/2014 | Alkove | G06F 21/10 713/189 |
| 2001/0055388 | A1* | 12/2001 | Kaliski, Jr. | H04L 9/085 380/30 |
| 2003/0079121 | A1* | 4/2003 | Gilman | H04L 12/4641 713/153 |
| 2004/0030932 | A1* | 2/2004 | Juels | H04L 63/083 713/151 |
| 2005/0036615 | A1* | 2/2005 | Jakobsson | H04L 9/3234 380/255 |
| 2009/0106563 | A1* | 4/2009 | Cherpantier | G06F 21/83 713/194 |
| 2009/0119518 | A1* | 5/2009 | Staddon | G06F 21/3227 713/193 |
| 2009/0122986 | A1* | 5/2009 | Tahan | H04L 9/06 380/270 |
| 2009/0138700 | A1* | 5/2009 | Miyazaki | H04L 9/0894 713/150 |
| 2009/0175443 | A1* | 7/2009 | Kolesnikov et al. | 380/44 |
| 2011/0110525 | A1* | 5/2011 | Gentry | H04L 9/0822 380/285 |
| 2011/0161677 | A1* | 6/2011 | Savagaonkar | G06F 12/1441 713/189 |
| 2011/0246789 | A1* | 10/2011 | Feix | G06F 7/723 713/190 |

OTHER PUBLICATIONS

Goyal et al., "Efficient Two Party and Multi Party Computation Against Covert Adversaries", Advances in Cryptology—EUROCRYPT 2008, vol. 4965, pp. 289-306 Istanbul Turkey (2008).

Jarecki et al., "Efficient Two-Party Secure Computation on Committed Inputs", Advances in Cryptology EUROCRYPT 2007, vol. 4515, pp. 97-114 Barcelona, Spain, (2007).

Mohassel et al., "Efficiency Tradeoffs for Malicious Two-Party Computation", 9th Int'l Conference on Theory and Practice of Public Key Cryptography, vol. 3958, pp. 458-473, New York, NY, (2006).

David P. Woodruff, "Revisiting the Efficiency of Malicious Two-Party Computation", Advances in Cryptology—EUROCRYPT 2007, vol. 4515, pp. 79-96, Barcelona, Spain (2007).

Lindell et al., "An Efficient Protocol for Secure Two-Party Computation in the Presence of Malicious Adversaries", Advances in Cryptology—EUROCRYPT 2007, vol. 4515, pp. 52-78, Barcelona, Spain (2007).

Lindell et al., "A Proof of Yao's Protocol for Secure Two-Party Computation", Journal of Cryptology, 22(2):161-188 (2006).

Naor et al., "Efficient Oblivious Transfer Protocols", ACM-SIAM Symposium on Discrete Algorithms, pp. 448-457 (2001).

Jaarvinen et al., "Embedded SFE: Offloading Server and Network Using Hardware Tokens", Financial Cryptography and Data Security, (2010).

Dziembowski et al., "Leakage-Resilient Cryptography", pp. 293-302 (2008).

Pietrzak, Krzysztof, "A Leakage-Resilient Mode of Operation", EUROCRYPT, pp. 462-482 (2009).

* cited by examiner

LEAKAGE RESILIENT GARBLED CIRCUIT GENERATION USING REDUCED MEMORY HARDWARE TOKEN

CROSS REFERENCE TO RELATED APPLICATION

This application claims priority to U.S. Provisional Application No. 61/387,102, filed Sep. 28, 2010, incorporated by reference herein in its entirety.

FIELD OF THE INVENTION

The present invention relates generally to techniques for securing electronic transactions and, more particularly, to secure function evaluation (SFE) techniques that provide privacy to the parties of such electronic transactions.

BACKGROUND OF THE INVENTION

Two-party general secure function evaluation (SFE) allows two parties to evaluate any function on their respective inputs x and y, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. As computation and communication resources have increased, SFE has become truly practical for common use. A malicious SFE model provides a guarantee of complete privacy of the players' inputs, even when a dishonest player follows an arbitrary cheating strategy.

Existing generic two-party SFE algorithms typically employ Garbled Circuits (GCs). For a detailed discussion of GCs, see, for example, Y. Lindell and B. Pinkas, "A Proof of Yao's Protocol for Secure Two-Party Computation," Journal of Cryptology, 22(2):161-188 (2009). For reasonably complex functions, however, the data transfer required for SFE is prohibitive. In fact, the communication complexity of GC-based SFE protocols is dominated by the size of the GC, which can reach Megabytes or Gigabytes even for relatively small and simple functions (e.g., the GC for a single secure evaluation of the block cipher AES has size 0.5 Megabytes).

While transmission of large amounts of data is often possible, existing networks will not scale, should SFE be widely deployed. This is particularly true for wireless networks, or for larger scale deployment of secure computations, e.g., by banks or service providers, with a large number of customers. Additional obstacles include energy consumption required to transmit/receive the data, and the resulting reduced battery life in mobile clients, such as smartphones. Computational load on the server is also a significant problem. Moreover, security against more powerful malicious adversaries requires the use of the standard cut-and-choose technique, which in turn requires transfer of multiple GCs.

Thus, a number of techniques have been proposed or suggested to employ a hardware token at the client to improve the communication efficiency of Yao's garbled circuit generation. See, e.g., K. Jaarvinen et al. "Embedded SFE: Offloading Server and Network Using Hardware Tokens," Financial Cryptography and Data Security, FC 2010, incorporated by reference herein in its entirety. The token allows much of the data to be generated locally by the client, avoiding much of the data transfer (a few Kilobytes, for example, may still be needed). The existing token-based techniques for Yao's garbled circuit generation, however, assume complete tamper-resistance of the hardware token. These techniques may not remain secure if the attacker gains even a few bits of information about the internal state of the token, using side-channel techniques, such as differential power analysis or an analysis of electro-magnetic radiation.

U.S. patent application Ser. No. 13/173,612, filed Jun. 30, 2011, entitled "Garbled Circuit Generation in a Leakage-Resilient Manner," (now U.S. Pat. No. 8,881,295), incorporated by reference herein in its entirety, discloses garbled circuit generation techniques for generic two-party SFE algorithms that do not require complete tamper-resistance of the hardware token. While the disclosed garbled circuit generation techniques provide secure generation of GCs, even in the presence of continual, adaptive information leakage during execution of the token, they require the use of a token having significant memory capacity to store a garbled circuit. A need therefore remains for secure garbled circuit generation techniques having a reduced storage requirement.

SUMMARY OF THE INVENTION

Generally, methods and apparatus are provided for generating a garbled circuit for a client in a leakage-resilient manner and with a reduced memory requirement, for use in secure function evaluation between the client and a server. According to one aspect of the invention, the garbled circuit is generated with a reduced storage requirement by obtaining a token from the server, wherein the token comprises a leakage-protected area: querying the token gate-by-gate, wherein for each gate of the garbled circuit, the token generates new wire garblings and stores them with the client using a Stream Cipher and interacts with the leakage-protected area to generate a garbled table for the gate; and receiving the garbled circuit from the token.

According to a further aspect of the invention, the Stream Cipher is leakage-resilient. The Stream Cipher can be a symmetric-key cryptographic primitive that has a secret key as an input and generates an unbounded stream of pseudorandom bits as an output. The number of evaluations of the Stream Cipher should be kept to a substantial minimum. For example, the Stream Cipher can execute with a same key only twice, such as only once for an encryption and only once for a decryption.

According to yet another further aspect of the invention, the leakage-protected area does not substantially leak information. The leakage-protected area may comprise a circuit embedded inside the token.

A more complete understanding of the present invention, as well as further features and advantages of the present invention, will be obtained by reference to the following detailed description and drawings.

DETAILED DESCRIPTION

The present invention improves upon existing generic two-party SFE algorithms that employ a tamper-proof hardware token at the client to improve the communication efficiency of Yao's garbled circuit generation. According to one aspect of the invention, a communication-efficient protocol is provided with reduced memory requirements for Yao's garbled circuit generation using a tamper-proof hardware token embedded with a secret seed for a stream cipher (SC). The present invention provides secure garbled circuit generation techniques with a reduced storage requirement by securely leveraging memory of the client.

The present invention recognizes that a GC constructor token needs to know the correspondence between circuit wire values and their garblings, to construct garbled tables. Moreover, the adversary needs to learn only a single bit of leakage (e.g., the last bit of the garbling of the wire value 0) to obtain additional information about the other party's inputs, and hence break the security of garbled circuit generation.

A small leakage-free component, referred to as a "leakage-protected area", inside the token is assumed and employed in the GC generator. As used herein, a leakage-protected area is immune from leakage attacks, even though the input/output wires of the leakage-protected area may leak information, the internal wires of the leakage-protected area do not leak any information. For example, the leakage-protected area can be fabricated between layers in an integrated circuit to reduce the possibility of leakage. The leakage-protected area can be embodied, for example, as a small shielded or otherwise leakage-protected circuit that is embedded inside the token, T, and is capable of basic operations, such as addition and generation of random bits. While one embodiment of the present invention employs a leak proof leakage-protected area, the present invention applies even if there is some amount of leakage, which may be acceptable in some applications, as would be apparent to a person of ordinary skill in the art.

Garbled tables can be generated in the regular leakage-susceptible area of the token. The role of the leakage-protected area is to facilitate the token being oblivious to the correspondence between a wire value and its garbling. This is achieved by representing this correspondence as a bit, which is generated and encoded inside the leakage-protected area. This encoding, which protects the underlying bit against a class of leakage functions, is stored in the token. During garbled table construction, the gate's incoming and outgoing wire garblings and the corresponding bit encodings are passed to the leakage-protected area, which then outputs the encodings of the garbled table entries. These encodings are then encrypted by the token and output to the adversary. An example of a simple bit encoding, which protects against a reasonably powerful class of leakage functions, is the representation of the bit b as a string of random bits, whose exclusive OR (XOR) function is equal to b.

As discussed in U.S. patent application Ser. No. 13/173, 612, filed Jun. 30, 2011, entitled "Garbled Circuit Generation in a Leakage-Resilient Manner," (now U.S. Pat. No. 8,881, 295), the server initially sends the token to the client, as part of a token transfer process. Thereafter, the token securely generates the garbled circuit for the client, without communicating with the server. Security holds even if the client can obtain internal information during execution.

The present invention can be employed when the token has a relatively small memory size (e.g., on the order of a few kilobytes) and cannot hold the entire garbled circuit in memory. As discussed hereinafter, the wire garblings are stored in an encrypted manner with the Client. During GC generation, the already-generated GC pieces are accessed in a pattern. Standard "random-access" encryption schemes are secure only for a very limited class of leakage functions and are very inefficient, so the present invention employs a "sequential-access" encryption scheme, based on a pseudorandom number generator (PRG). Such schemes can be shown to be secure in the presence of leakage, and are very efficient. As discussed further below in conjunction with FIG. 3, the present invention provides an algorithm that performs the necessary encryptions using a "sequential-access" encryption for garbling arbitrarily complex Boolean circuits.

Figure 1:
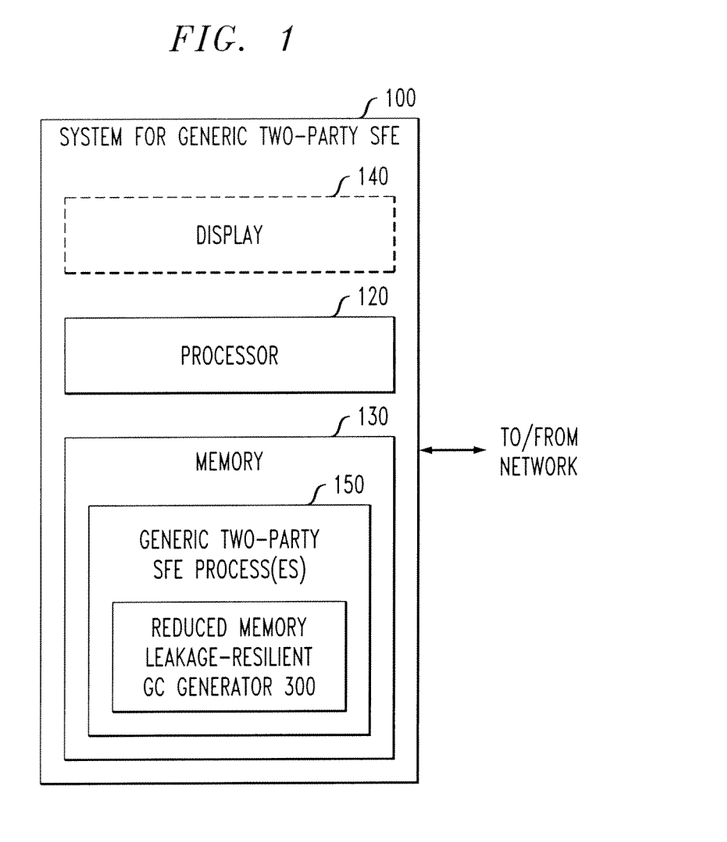
FIG. 1 is a block diagram of an improved system for generic two-party SFE that can implement the processes of the present invention.

FIG. 1 is a block diagram of an improved generic two-party SFE system 100 that can implement the features of the present invention. As shown in FIG. 1, memory 130 configures the processor 120 to implement the generic two-party SFE methods, steps, and functions disclosed herein (collectively, shown as 150 in FIG. 1). The generic two-party SFE methods 150 further comprise a reduced memory leakage-resilient GC generator 300, discussed further below in conjunction with FIG. 3. The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

Generic Two-Party SFE Algorithms

As previously indicated, existing generic two-party SFE algorithms typically employ Garbled Circuits (GCs). Y. Lindell and B. Pinkas, "A Proof of Yao's Protocol for Secure Two-Party Computation," Journal of Cryptology, 22(2):161-188 (2009). For a detailed discussion of exemplary existing generic two-party SFE algorithms, see, for example, Payman Mohassel and Matthew Franklin, "Efficiency Tradeoffs for Malicious Two-Party Computation," Moti Yung et al., editors, PKC 2006: 9th International Conference on Theory and Practice of Public Key Cryptography, Vol. 3958 of Lecture Notes in Computer Science, 458-473 (New York, N.Y.; Apr. 24-26, 2006); Yehuda Lindell and Benny Pinkas, "An Efficient Protocol for Secure Two-Party Computation in the Presence of Malicious Adversaries," Moni Naor, editor, Advances in Cryptology—EUROCRYPT 2007, Vol. 4515 of Lecture Notes in Computer Science, 52-78 (Barcelona, Spain, May 20-24, 2007); David P. Woodruff, "Revisiting the Efficiency of Malicious Two-Party Computation," In Moni Naor, editor, Advances in Cryptology—EUROCRYPT 2007, Vol. 4515 of Lecture Notes in Computer Science, 79-96 (Barcelona, Spain, May 20-24, 2007); Stanislaw Jarecki and Vitaly Shmatikov, "Efficient Two-Party Secure Computation on Committed Inputs," In Moni Naor, editor, Advances in Cryptology—EUROCRYPT 2007, Vol. 4515 of Lecture Notes in Computer Science, 97-114 (Barcelona, Spain, May 20-24, 2007); and/or Vipul Goyal et al., "Efficient Two Party and Multiparty Computation Against Covert Adversaries," In Nigel P. Smart, editor, Advances in Cryptology—EUROCRYPT 2008, Vol. 4965 of Lecture Notes in Computer Science, 289-306 (Istanbul, Turkey, Apr. 13-17, 2008), each incorporated by reference in its entirety.

Figure 2:
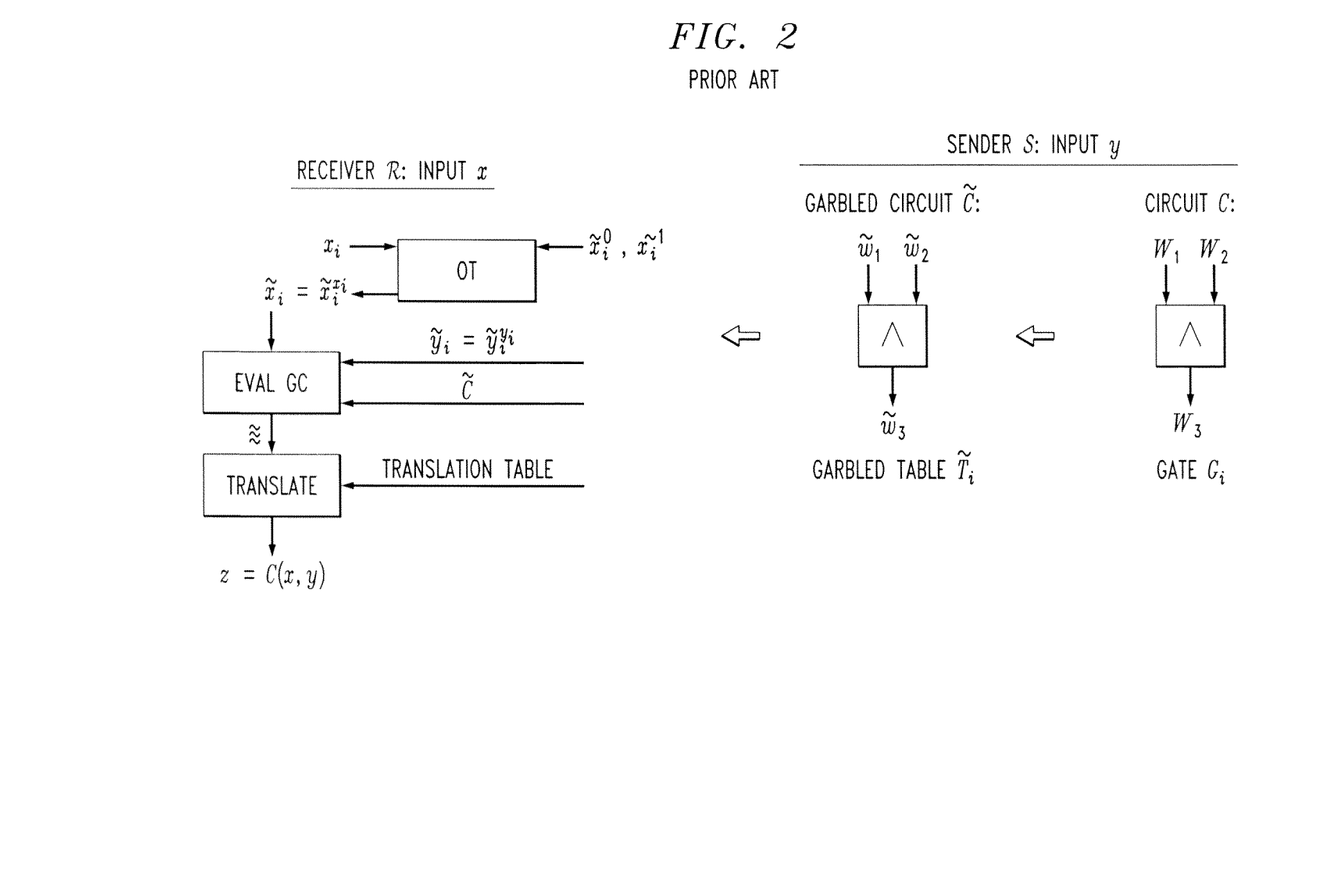
FIG. 2 is a block diagram of a conventional Garbled Circuit-based SFE.

FIG. 2 is a block diagram of a conventional Garbled Circuit-based SFE 200. Generally, as shown in FIG. 2, Yao's Garbled Circuit (GC) approach allows two parties, sender S with private input y and receiver R with private input x, to securely evaluate a boolean circuit C on (x, y) without revealing any information other than the result z=C(x, y) of the evaluation. In particular, no intermediate values are revealed.

The circuit constructor S creates a garbled circuit $\tilde{C}$ from the circuit C: for each wire $W_i$ of C, two garblings $\tilde{w}_i^0, \tilde{w}_i^1$ are randomly chosen, where $\tilde{w}_i^j$ is the garbled value of $W_i$'s value j. (Note: $\tilde{w}_i^j$ does not reveal j). Further, for each gate $G_i$, S creates a garbled table $\tilde{T}_i$ with the following property: given a set of garbled values of $G_i$'s inputs, $\tilde{T}_i$ allows to recover the garbled value of the corresponding $G_i$'s output. S sends these garbled tables, together called garbled circuit $\tilde{C}$, to evaluator (receiver R).

Additionally, R (obliviously) obtains the garbled inputs $\tilde{w}_i$ corresponding to the inputs of both parties: the garbled inputs $\tilde{y}$ corresponding to the inputs y of S are sent directly: $\tilde{y}_i = \tilde{y}_i^{y_i}$. For each of R's inputs $x_i$, both parties run a 1-out-of-2 Oblivious Transfer (OT) protocol (e.g., M. Naor and B. Pinkas, Efficient Oblivious Transfer Protocols, ACM-SIAM Symposium On Discrete Algorithms (SODA'01), 448-457 (Society for Industrial and Applied Mathematics, 2001), where S inputs $\tilde{x}_i^0, \tilde{x}_i^1$ and R inputs $x_i$. The OT protocol ensures that R receives only the garbled value corresponding to his or her input bit, i.e., $\tilde{x}_i = \tilde{x}_i^{x_i}$ while S learns nothing about $x_i$.

Now, R evaluates the garbled circuit $\tilde{C}$ (which comprises the garbled tables $\tilde{T}_i$) on the garbled inputs to obtain the garbled output $\tilde{z}$ by evaluating $\tilde{C}$ gate by gate, using the garbled tables $\tilde{T}_i$. Finally, R determines the plain value z corresponding to the obtained garbled output value using an output translation table sent by S.

As previously indicated, the present invention improves the conventional garbled circuit generator 200 of FIG. 2 by addressing the possibility of side-channel leakage of information by the token T. Thus, the disclosed generic two-party SFE algorithms do not require complete leakage-resistance of the hardware token. As discussed hereinafter, this information, collected and accumulated by a malicious client B, may lead to a complete compromise of T's internal state, and thus to a compromise of server A's private inputs.

In the client-server setting of the present invention, a server A has generated and initialized a secure token T, and sent the token to the client B. T now interacts with B and answers his or her queries on behalf of A. B communicates locally with T, and remotely with A. There is no direct channel between T and A, but of course B can pass (and potentially interfere with) messages between T and A. T is created by A, so A trusts T; however, as B does not trust A, she also does not trust the token T to behave honestly.

By delegating GC generation to T, A offloads a majority of his computation to T, and avoids transferring GC to B. A now only needs to execute several oblivious transfers to send B the garblings of the input wires, and perform certain checks to prevent cheating B.

It is noted that T need not know the circuit C for which it generates GC. As discussed further below in conjunction with FIG. 3, T may operate simply by responding to B's requests to process the next gate. T need not verify the validity of these requests; A, who holds the input, performs this check (e.g., based on the digest of the sequence of queries computed and sent by T), and proceeds with GC evaluation conditional on successful verification. Thus, it can be assumed that the circuit C may be pre-processed, represented in a convenient canonical form, and queried to T in the right order.

Adversarial Model

A hybrid semi-honest model is considered, where the only allowed malicious behavior is for token receiver B to arbitrarily apply leakage functions to the token T. This is a natural generalization of the semi-honest model, which lends itself to the application of standard techniques for achieving full security against active adversaries. That is, the disclosed protocols can be easily compiled into fully malicious-secure protocols, e.g., by using zero-knowledge proofs or garbled circuit cut-and-choose. See, e.g., Payman Mohassel and Matthew Franklin. "Efficiency Tradeoffs for Malicious Two-Party Computation," Moti Yung et al., editors, PKC 2006: 9th Int'l Conf. on Theory and Practice of Public Key Cryptography, Vol. 3958 of Lecture Notes in Computer Science, 458-473, Apr. 24-26, 2006; David P. Woodruff, "Revisiting the Efficiency of Malicious Two-Party Computation," Moni Naor, editor, Advances in Cryptology, EUROCRYPT 2007, Vol. 4515 of Lecture Notes in Computer Science, 79-96, May 20-24, 2007; or Yehuda Lindell and Benny Pinkas, "An Efficient Protocol for Secure Two-Party Computation in the Presence of Malicious Adversaries," Moni Naor, editor, Advances in Cryptology, EUROCRYPT 2007, Vol. 4515 of Lecture Notes in Computer Science, 52-78, May 20-24, 2007, each incorporated by reference herein in their entirety.

Reduced Memory Leakage-Resilient Garbled Circuit Generator

The exemplary embodiment of the present invention considers (without loss of generality) a layered fan-in-2 and fan-out-2 circuits. Generally, in a layered circuit, all the input wires into a gate at a certain level are the output wires of gates from previous level. The terms "fan-in" and "fan-out" indicate the number of wires coming in and out, respectively, of a gate. Thus, a fan-in-2 and fan-out-2 gate has two input wires and two output wires, respectively. A fan-in-2 and fan-out-2 circuit thus consists of at most fan-in-2 and fan-out-2 (i.e., smaller fan-in and fan-out are allowed, but not greater). Any circuit can be made layered simply by appropriately adding one-input one-output dummy gates.

In the exemplary embodiment, the hardware token T only requires a small amount of memory (e.g., enough to store a few keys) and an interface to write/read encrypted data to/from the token holder B (i.e., the client). The token T also has a small embedded leakage-protected area.

In addition, as discussed hereinafter, the exemplary embodiment makes use of a stream cipher (SC), a symmetric-key cryptographic primitive that takes as input a secret key and generates an unbounded stream of pseudorandom bits (which, e.g., can be used as a one-time pad). A polynomial-time bounded machine can't distinguish between pseudorandom and random bits.

The SC can evolve the secret state. Thus, the SC can be protected against leakage. See, e.g., Stefan Dziembowski and Krzysztof Pietrzak, "Leakage-Resilient Cryptography," Foundations of Computer Science (FOCS) 2008, 293-302 (2008); or Krzysztof Pietrzak, "A Leakage-Resilient Mode of Operation," EUROCRYPT, 462-482 (2009), each incorporated by reference herein in their entirety.

The present invention uses the SC for generating garbled circuits (GCs), and avoiding pseudorandom functions (PRFs) (which are much harder to secure against leakage). Since the disclosed techniques are based on SC, data encryption/decryption is performed by applying a (pseudo)random pad. However, to protect SC keys from large amounts of leakage, the present invention minimizes the number of evaluations of SC, particularly those with the same internal secret state. To address this, the disclosed construction ensures that the SC executes with the same key only twice: once each for encryption and decryption. The SC-generated pad can thus be viewed as a tape with a read and a write head, both of which only move forward, i.e., the data is removed (or, becomes inaccessible) from the tape after being read once.

In the exemplary construction, the token T uses a master key MK with SC to generate the wire garblings. In addition, the token T stores four SC keys which will generate four private tapes $t_l$; $t_r$; $t^1_w$; $t^2_w$. Here $t_l$ and $t_r$ are used to store wire garblings corresponding to the left and right gate-output wires, respectively, and $t^1_w$ and $t^2_w$ are work tapes. For a circuit of depth d, the circuit levels are numbered starting from the circuit's input (the lowest level), i.e., the input gates are at level 1, and the output gates are at level d.

The disclosed reduced memory leakage-resilient garbled circuit generator initially labels the circuit's wires and gates. The process starts with the circuit's output level gates and wires by assigning decimal and ($\lceil\log\rceil$-bit) binary labels, respectively, from left to right in an increasing order starting with zero. The exemplary embodiment assumes without loss of generality that the circuit output gates have only one output wire each. Then, the following two steps are repeated until all the gates and wires are labeled:

(a) Once all the output wires of gates at a particular level are labeled, label the gates at that level by the decimal number corresponding to the binary output wire label of that gate. If a gate has more than one output wire, assign the lowest decimal number to the gate.

(b) After assigning decimal labels to all the gates at a particular level, label the left and right input wires of any gate by appending 0 and 1, respectively, to the binary representation of the gate label. If a gate has just one input wire, it is treated as the left wire.

Before the garbled table generation process is started, the token T uses the master key MK to generate the wire garblings for the circuit-output wires in the increasing order of wire labels, and stores them either on tape $t_l$ or $t_r$, depending on whether they are the left or the right gate-output wires.

Thereafter, garbled tables are generated level-by-level in the decreasing level order, starting from output gates. At each level in the circuit, the garbled tables for gates at that level are generated in the (increasing) order of the gate labels. To generate the garbled table(s) for a particular gate (with the help of the leakage-protected area), the token T needs to know the input and output wire garblings of that gate. If a gate has more than one output wire, then for each of the output wires a separate garbled table is generated. The following steps are performed for each gate in the circuit, where the gates are processed in the order specified above:

(a) Read the next value from $t_l$ and, for a fan-out-2 gate, also from $t_r$—these are the gate-output wire(s) garblings that were stored earlier on the tapes. As discussed hereinafter, the invariant is maintained that the read heads are always reading "the right next value".

(b) Generate (using MK) the gate-input wire(s) garblings, and generate (with the help of the leakage-protected area) and output the garbled table(s) for the gate.

(c) Store the above generated input-wire(s) garblings on $t_l$ or $t_r$ depending on whether they are the left or right gate-output wires of the ancestor gate.

Once the garbled tables for all the gates at a level are generated, before moving on to the next level, the wire garblings stored on $t_r$ are sorted according to their siblings which are stored on $t_l$. That is, the invariant above is satisfied where elements on $t_r$ match those on $t_l$ and both match the next-processed gate. Let n be the number of elements on $t_r$. Below, a sorting algorithm is presented that makes use of the two work tapes $t^1_w$ and $t^2_w$, and proceeds in $\lceil\log n_w\rceil$ rounds. It is again noted that the work tapes can also be accessed in only one direction. In round $i=1, \ldots, \lceil\log n_w\rceil$, the following operations are performed (observe, here, after round i, $t_r$ comprises sorted blocks of size $2^i$):

(a) Reading Phase. Read the first $2^i$ elements from $t_r$, and write the first $2^{i-1}$ elements on $t^1_w$ and the last $2^{i-1}$ elements on $t^2_w$. Similarly, read the next $2^i$ elements from $t_r$, and write the first $2^{i-1}$ elements on $t^1_w$ and the last $2^{i-1}$ elements on $t^2_w$, continue this until all the elements from $t_r$ are read and written on $t^1_w$ and $t^2_w$.

(b) Comparison Phase. Next, elements on $t^1_w$ and $t^2_w$ are compared, based on the labels of their left siblings (which are already aligned with the gate labels). The comparison will proceed in $j=n_w/2^{i-1}$ steps, where in each step, a block of $2^{i-1}$ elements each from $t^1_w$ and $t^2_w$ are compared and written on $t_r$, as follows:

Read one element at a time from each tape and compare their siblings. Write the element with smaller sibling on $t_r$, and move the read head forward of only the tape whose element was written on $t_r$, the other read head remains at its position. Repeat this until $2^{i-1}$ elements from either of $t^1_w$ or $t^2_w$ are written on $t_r$, then write the remaining elements (from the block of i elements) from the other tape on $t_r$.

Figure 3:
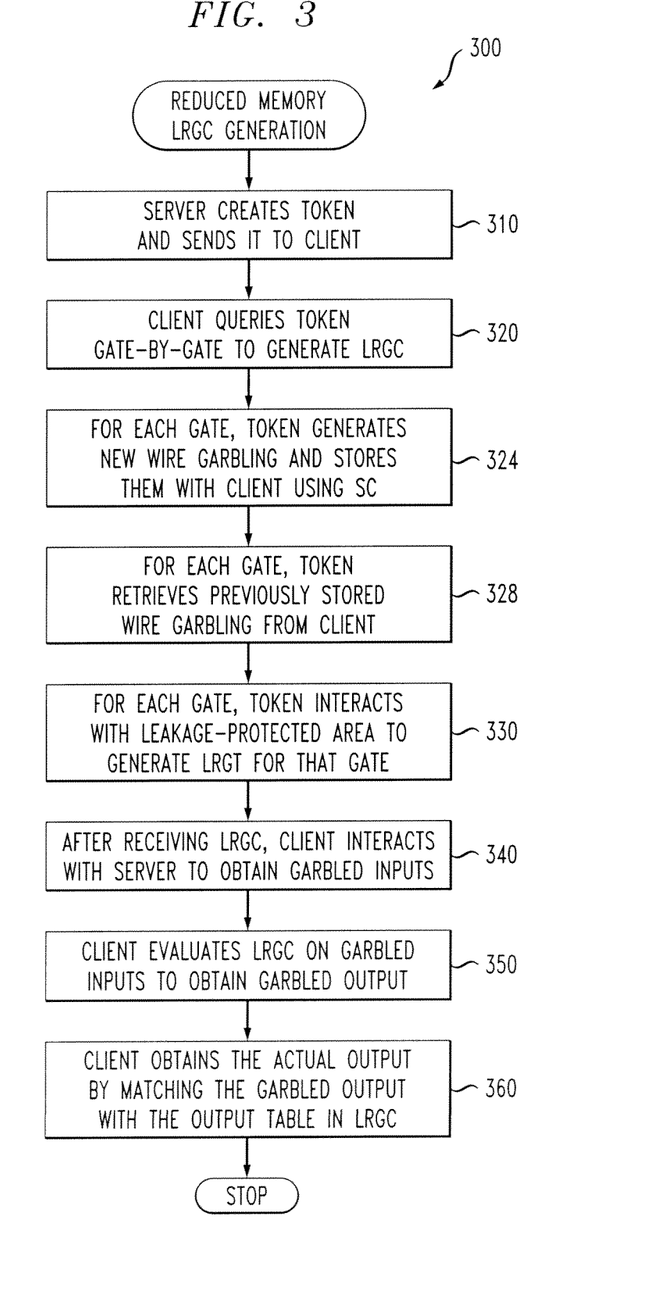
FIG. 3 is a flow chart describing an exemplary implementation of an SFE process based on a reduced memory leakage-resilient garbled circuit generator.

FIG. 3 is a flow chart describing an exemplary implementation of a reduced memory leakage-resilient garbled circuit generator 300 incorporating aspects of the present invention. The exemplary leakage-resilient garbled circuit generator 300 of FIG. 3 employs a token having significant memory capacity to store a garbled circuit. The exemplary leakage-resilient garbled circuit generator 300 of FIG. 3 can be employed, for example, when the token has a relatively small memory size (e.g. on the order of a few kilobytes) and cannot hold the entire garbled circuit in memory. As discussed hereinafter, the garbled circuit is stored in an encrypted manner with the Client. During GC generation, the already-generated GC pieces are accessed in a pattern.

In the notation of FIG. 3, the term "LRGC" indicates a garbled circuit generated in leakage-resilient manner, the term "LRGT" indicates a garbled table generated in a leakage-resilient manner, the term "SC" indicates a Stream Cipher and the term "LPA" indicates a leakage-protected area. At a high level, the LR generation of GT involves relying on the random and unknown to T correspondence between wire values and corresponding secrets. As shown in FIG. 3, during step 310 of the exemplary reduced memory leakage-resilient garbled circuit generator 300, the server A initially creates a token T and sends T to the client B. During step 320, the client B queries T gate-by-gate to generate the LRGC.

The disclosed construction relies on LR bit encoding and LR double-key encryption. LR encoding is an algorithm for representing a bit as a bit string in such a way that the original value cannot be computed from the encoding by a certain class of functions, which presumably includes the leakage functions occurring in practice. Decode, the inverse operation, which lies outside of this class, recovers the original bit.

LR double encryption (DE) $\epsilon$ is LR encryption, which takes as input two keys, and whose decryption procedure allows to determine whether the decryption has succeeded.

During step 324, for each gate, the token T generates new wire garblings and stores them with the Client using the SC, in the manner described above. During step 328, for each gate, the Token T retrieves the previously stored wire garbling from the Client, in the manner described above.

During step 330, for each gate, T interacts with the leakage-protected area to generate LRGT for that gate. Consider a gate g with input wires ($w_1$, $w_2$) and output wires ($w_3$, $w_4$). First, for every wire $w_i$ connected to g for which the wire garblings have not yet been generated, the token T generates and stores a triple (i.e., an ordered set of three elements) ($k_i^0, k_i^1, k_i$), where $k_i^0, k_i^1 \in K$ are picked (pseudo)randomly from the key space of DE, and $k_i \leftarrow$ Encode($b_i$) is an encoding of a (pseudo) random bit $b_i$. The wire keys $k_i^0, k_i^1$'s correspondence to wire bit values is determined by $b_i$. The garbling of the value v of the i-th wire is set to be $k_i^{b \oplus v}$ (or, in other words, the wire key $k_i^v$ corresponds to the wire value $b_i \oplus v$).

The leakage-protected area then computes and returns $(\{w_{ij}^3 \cdot w_{ij}^4\} ij \in \{0,1\})$, where for $i, j \in \{0,1\}$ and $1-1, \ldots, 4$:

$$b_1 \leftarrow Decode(k_1),$$

$$g_{ij} \leftarrow g(b_1 \oplus i, b_2 \oplus j),$$

$$w_{ij}^3 \leftarrow Encode(k_3^{b3 \oplus g_{i,j}}), w_{i,j}^4 \leftarrow Encode(k_4^{b4 \oplus g_{i,j}})$$

(For $i, j \in \{0,1\}$, $g_{i,j}$ is the gate's output wires' value when its input wires have values $b_1 \oplus i$ and $b_1 \oplus j$, which means that in the standard garbled table generation, the wire key $k_3^{b3 \oplus g_{i,j}}$ should be encrypted with wire keys $k_1^i$ and $k_2^j$, and similarly the wire key $k_4^{b4 \oplus g_{i,j}}$ should be encrypted with wire keys $k_1^i$ and $k_2^j$. The leakage-protected area, therefore, encodes the output wire keys in the above order, so that T will later be able to construct the garbled table without ever requiring the knowledge of wire keys' correspondence to their bit values. Also, note that Encode is applied independently bit-by-bit to the multi-bit input string.)

T then computes for $i, j \in \{0,1\}$:

$$c_{i,j}^3 \leftarrow \epsilon_{k_1^i, k_2^j}(w_{i,j}^3), c_{i,j}^4 \leftarrow \epsilon_{k_1^i, k_2^j}(w_{i,j}^4),$$

and assigns and outputs $GT_g \leftarrow (\{c_{i,j}^3, c_{i,j}^4\} i, j \in \{0,1\})$ Finally, the leakage-resilient garbled circuit $GC_f$ comprises leakage-resilient garbled tables for all the gates in C, and the decryption tables for the output wires, which are simply the association of output wire keys with their values, i.e., $$GC_f = (\{GT_g\} g \in C, \{0 \leftrightarrow k_i^{bi \oplus 0}, 1 \leftrightarrow k_i^{bi \oplus 1}\} i = m-n+1, \ldots, m)$$

As shown in FIG. 3, after receiving the LRGC, the client interacts with the server during step 340 to obtain garbled inputs. In particular, the server sends the client input wire keys (one key out of $(k_i^0, k_i^1)$ for each $i \in [2n]$, depending on the inputs of the server and client) ($\{k_i^{bi \oplus x[i]}\} i \in [n]$, $\{k_{n+j}^{bn+j \oplus y[j]}\} j \in [n]$), where for $l \in [2n], b_1 \leftarrow Decode(k_1)$. Keys corresponding to the client's input are sent via oblivious transfer, in a known manner.

The client evaluates the LRGC on the garbled inputs to obtain the garbled output during step 350, and then obtains the actual output during step 360 by matching the garbled output with the output table in LRGC. Thus, on receiving the leakage-resilient garbled circuit $GC_f$ and input wire keys ($\{k_i^{bi \oplus x[i]}\} i \in [n]$, $\{k_{n+j}^{bn+j \oplus y[j]}\} j \in [n]$), the client decrypts and evaluates all the garbled gates one-by-one, and then computes the output by finding the appropriate bit values for all the output wires from the decryption table, also contained in $GC_f$.

System and Article of Manufacture Details

While FIG. 3 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method, comprising:
    querying, by a client, a hardware token gate-by-gate, said hardware token comprising a leakage-protected area, wherein for each gate of a garbled circuit, the hardware token generates new wire garblings and stores said new wire garblings in an encrypted manner with the client using a Stream Cipher and interacts with the leakage-protected area to generate a garbled table for the gate, wherein the garbled circuit is generated based on a random correspondence between wire values and the corresponding garblings that is unknown to the hardware token, wherein the hardware token is obtained from a server; and
    receiving, by the client, the garbled circuit from the hardware token.

2. The method of claim 1, wherein said Stream Cipher is a symmetric-key cryptographic primitive that has a secret key as an input and generates an unbounded stream of pseudorandom bits as an output.

3. The method of claim 1, further comprising the step of performing a number of evaluations of said Stream Cipher, wherein said number satisfies a predefined criteria.

4. The method of claim 3, wherein said Stream Cipher executes with a same key only once for an encryption and only once for a decryption.

5. The method of claim 1, further comprising the steps of:
    interacting with said server to obtain garbled inputs;
    evaluating the garbled circuit on the garbled inputs to obtain a garbled output; and
    obtaining a final output by matching the garbled output with an output table in the garbled circuit.

6. The method of claim 1, wherein the leakage-protected area comprises a circuit embedded inside the hardware token.

7. The method of claim 1, wherein the garbled circuit comprises garbled tables for all gates in a Boolean circuit, and decryption tables for output wires.

8. The method of claim 1, wherein said Stream Cipher is leakage-resilient.

9. The method of claim 1, wherein said Stream Cipher executes with a same key only twice.

10. An apparatus for generating a garbled circuit in a leakage-resilient manner, used in secure function evaluation between the client and a server, comprising:
    a memory; and
    at least one hardware device, coupled to the memory, configured to perform the following steps:
    querying, by a client, a hardware token gate-by-gate, said hardware token comprising a leakage-protected area, wherein for each gate of a garbled circuit, the hardware token generates new wire garblings and stores said new wire garblings in an encrypted manner with the client using a Stream Cipher and interacts with the leakage-protected area to generate a garbled table for the gate, wherein the garbled circuit is generated based on a random correspondence between wire values and the corresponding garblings that is unknown to the hardware token, wherein the hardware token is obtained from said server; and
    receiving, by the client, the garbled circuit from the token.

11. The apparatus of claim 10, wherein said Stream Cipher is a symmetric-key cryptographic primitive that has a secret key as an input and generates an unbounded stream of pseudorandom bits as an output.

12. The apparatus of claim 10, wherein said at least one hardware device is further configured to perform a number of evaluations of said Stream Cipher, wherein said number satisfies a predefined criteria.

13. The apparatus of claim 10, wherein said Stream Cipher executes with a same key only twice.

14. The apparatus of claim 13, wherein said Stream Cipher executes with a same key only once for an encryption and only once for a decryption.

15. The apparatus of claim 10, wherein said at least one hardware device is further configured to:
    interact with said server to obtain garbled inputs;
    evaluate the garbled circuit on the garbled inputs to obtain a garbled output; and
    obtain a final output by matching the garbled output with an output table in the garbled circuit.

16. The apparatus of claim 10, wherein the leakage-protected area comprises a circuit embedded inside the hardware token.

17. The apparatus of claim 10, wherein said Stream Cipher is leakage-resilient.

18. An apparatus, comprising:
    an integrated circuit; and
    a leakage-protected subset of the integrated circuit,
    wherein the integrated circuit is configured to receive a query from a client, and in response to said query, generate Previously Presented wire garblings, store said Previously Presented wire garblings in an encrypted manner with the client using a Stream Cipher and interact with the leakage-protected subset of the integrated circuit to generate a garbled table for a gate of a garbled circuit, wherein the garbled circuit is generated based on a random correspondence between wire values and the corresponding garblings that is unknown to the hardware token.

19. The apparatus of claim 18, wherein the leakage-protected subset comprises a circuit embedded inside the integrated circuit.

20. The apparatus of claim 18, wherein the garbled circuit comprises garbled tables for all gates in a Boolean circuit, and decryption tables for output wires.

21. The apparatus of claim 20, wherein the decryption tables comprise an association of output wire keys with their values.

* * * * *